United States Patent
Satou et al.

(10) Patent No.: US 8,323,560 B2
(45) Date of Patent: Dec. 4, 2012

(54) AUTOMOBILE HIGH-STRENGTH ELECTRIC RESISTANCE WELDED STEEL PIPE WITH EXCELLENT LOW-TEMPERATURE IMPACT PROPERTIES AND METHOD OF MANUFACTURING THE SAME

(75) Inventors: Motoo Satou, Kakogawa (JP); Yukihiro Utsumi, Kakogawa (JP); Kenichi Watanabe, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 711 days.

(21) Appl. No.: 12/036,631

(22) Filed: Feb. 25, 2008

(65) Prior Publication Data
US 2008/0226491 A1    Sep. 18, 2008

(30) Foreign Application Priority Data
Mar. 16, 2007    (JP) .................................. 2007-068730

(51) Int. Cl.
*C22C 38/20*    (2006.01)
*C21D 1/42*    (2006.01)
*C21D 1/18*    (2006.01)
*B23K 11/00*    (2006.01)

(52) U.S. Cl. ........ 420/90; 219/78.01; 148/320; 148/570

(58) Field of Classification Search .................. 148/519, 148/520, 320, 570; 420/90–93; 219/78.01; *B23K 11/00; C22C 38/00*
See application file for complete search history.

(56) References Cited

U.S. PATENT DOCUMENTS
2005/0034795 A1*  2/2005  Motoyoshi et al. ........... 148/570
2007/0071599 A1*  3/2007  Arai et al. ..................... 415/200

FOREIGN PATENT DOCUMENTS
| JP | 2-310340 | 12/1990 |
| JP | 4-180537 | 6/1992 |
| JP | 4-268016 | 9/1992 |
| JP | 4-276018 | 10/1992 |
| JP | 2001-164338 | 6/2001 |
| JP | 2003-129170 | 5/2003 |
| JP | 2006-152427 | 6/2006 |
| KR | 1997-0043169 | 7/1997 |
| WO | WO 2007/129676 A1 | 11/2007 |

OTHER PUBLICATIONS

Nisbett, Edward G. Steel Forgings: Design, Production, Selection, Testing and Application:(MNL 53). 2005 ASTM International.*
Office Action issued Aug. 11, 2010, in Chinese Patent Application No. 200810009844.7.

* cited by examiner

*Primary Examiner* — Jessica L Ward
*Assistant Examiner* — Alexander Polyansky
(74) *Attorney, Agent, or Firm* — Oblon, Spivak, McClelland, Maier & Neustadt, L.L.P.

(57) ABSTRACT

Disclosed is a high-strength electric resistance welded steel pipe which is manufacture from a steel sheet containing, on mass basis, 0.2% to 0.4% C, 0.05% to 0.5% Si, 0.5% to 2.5% Mn, 0.025% or less P, 0.01% or less S, 0.01% to 0.15% or Al, 0.01% to 2% Cu, 0.05% to 2% Cr, 0.005% to 0.2% Ti, and 0.0002% to 0.005% B, with the remainder being iron and inevitable impurities. The steel pipe has a tensile strength of 1750 N/mm² or more, a 0.1%-proof stress of 1320 N/mm² or more, and a Charpy impact value at a testing temperature of minus 40° C. of 50 J/cm² or more.

9 Claims, 2 Drawing Sheets

AUTOMOBILE HIGH-STRENGTH ELECTRIC RESISTANCE WELDED STEEL PIPE WITH EXCELLENT LOW-TEMPERATURE IMPACT PROPERTIES AND METHOD OF MANUFACTURING THE SAME

FIELD OF THE INVENTION

The present invention relates to ultrahigh-strength electric resistance welded steel pipes. Specifically, it relates to high-strength electric resistance welded steel pipes for automobiles, for use typically in automobile reinforcing members, such as door impact beams and bumpers, which are required of being lightweight and having high-strength, satisfactory shock absorptivity, and high impact resistance. It also relates to methods of manufacturing these steel pipes.

BACKGROUND OF THE INVENTION

Demands have been increasingly made to improve fuel efficiency of automobiles, from the viewpoint of energy saving. For energy saving, automobile body weights should be reduced, and materials for use in door impact beams and other reinforcing members of automobiles should have higher tensile strengths. The materials should also excel in shock absorptivity so that the doors less protrude into cabin upon impact to thereby protect occupants. In addition, they should be able to absorb impact energy satisfactorily at low temperatures, because such automobiles may be used and undergo impact accidents in cold regions.

Steel pipes composed of steels with a martensite microstructure have been widely used as such high-strength electric resistance welded steel pipes. United States Patent Application Publication No. 20050034795 discloses a technique relating to a steel pipe composed of a high-strength steel and having a reduced yield ratio, and a method of manufacturing the steel pipe. According to this technique, the yield strength of the steel pipe is determined under such a stress as to yield a 0.1% permanent strain. The document mentions that the properties of the steel pipe can be accurately determined according to this method, because an absorbable energy upon impact is underestimated when the yield strength is determined under such a stress as to yield a 0.2% permanent strain as specified in Japanese Industrial Standards (JIS). The steel pipe according to this technique, however, has a low yield strength, thereby undergoes local buckling at low loads upon bending, fails to have a high resistance to buckling loading (crushing strength), and less absorbs energy upon bending. As a result, it is difficult to absorb much energy upon impact.

Japanese Unexamined Patent Application Publication (JP-A) No. 2001-164338 discloses a technique for yielding a high-strength steel pipe by subjecting a steel pipe having an adjusted composition to induction hardening. The resulting steel pipe, however, has not been subjected to a treatment after quench hardening, has a low yield ratio of about 75% as determined under a 0.2%-proof stress, and fails to attain a high resistance to buckling loading (to have a high crushing strength).

JP-A No. H04-180537 discloses a technique of providing a steel pipe having a tensile strength TS of 100 kgf/mm$^2$ or more and a yield ratio of 80% or more. In this technique, a steel of an austenite structure is quenched to give a martensite microstructure, and this steel is tempered at high temperatures of 200° C. to 450° C. The resulting steel pipe, however, has a low strength of about 120 kgf/mm$^2$, although it has a high yield strength.

JP-A No. H04-276018 discloses a technique, in which a steel pipe having an adjusted composition is quenched, overaged at a temperature of 150° C. to 450° C. to give ferrite and martensite microstructures, processed to 1% to 30%, and bake-hardened. The resulting steel pipe, however, has a volume fraction of martensite of about 70% and a low strength in terms of tensile strength of 170 kgf/mm$^2$.

SUMMARY OF THE INVENTION

These known steel pipes do not have well-balanced, satisfactory tensile strength, shock absorptivity, and low-temperature impact properties. Accordingly, an object of the present invention is to provide a high-strength electric resistance welded steel pipe for automobiles, which is an ultrahigh-strength steel pipe having a tensile strength on the order of 1750 N/mm$^2$ and excels not only in shock absorptivity but also in low-temperature impact properties. Another object of the present invention is to provide a method of manufacturing the steel pipe.

After intensive investigations, the present inventors have found an ultrahigh-strength quench hardened, tempered steel pipe which has well-balanced, satisfactory tensile strength, shock absorptivity, and low-temperature impact properties and is suitable for use in reinforcing members of automobiles such as door impact beams. Specifically, they have specified the chemical composition of a steel so as to have satisfactory properties as a steel pipe, including tensile strength, shock absorptivity, and low-temperature toughness, i.e., absorbable energy upon impact at a low testing temperature and to have sufficient hardenability applicable to induction hardening.

Specifically, according to an embodiment of the present invention, there is provided a high-strength electric resistance welded steel pipe which contains:
  0.2 to 0.4 percent by mass carbon (C),
  0.05 to 0.5 percent by mass silicon (Si),
  0.5 to 2.5 percent by mass manganese (Mn),
  0.025 percent by mass of less phosphorus (P),
  0.01 percent by mass of less sulfur (S),
  0.01 to 0.15 percent by mass aluminum (Al),
  0.01 to 2 percent by mass copper (Cu),
  0.05 to 2 percent by mass chromium (Cr),
  0.005 to 0.2 percent by mass titanium (Ti), and
  0.0002 to 0.005 percent by mass boron (B).

This steel pipe has a tensile strength of 1750 N/mm$^2$ or more, a 0.1%-proof stress of 1320 N/mm$^2$ or more, and a Charpy impact value at a testing temperature of minus 40° C. of 50 J/cm$^2$ or more.

The high-strength electric resistance welded steel pipe desirably further contains one or more elements selected from:
  0.002 to 0.2 percent by mass niobium (Nb),
  0.005 to 0.5 percent by mass vanadium (V),
  0.005 to 0.5 percent by mass zirconium (Zr),
  0.02 to 1 percent by mass molybdenum (Mo),
  0.05 to 3 percent by mass nickel (Ni), and
  0.0005 to 0.005 percent by mass calcium (Ca).

The present inventors have also obtained the following findings to yield a high-strength electric resistance welded steel pipe for automobiles, which has high tensile strength and shock absorptivity and shows high impact properties even at low temperatures. Specifically, a steel pipe is improved in yield strength and yield ratio by adjusting the chemical composition of a material steel and preparing the steel under specific conditions to yield a martensite single phase microstructure, and tempering the steel at low temperatures to yield a tempered martensite microstructure in which fine iron carbide precipitates are dispersed in the steel.

They have found that the resulting steel pipe is resistant to local buckling even under high loads and thereby absorbs greater energy upon bending, and that the steel pipe can have improved impact properties at low temperatures and delayed fracture resistance by optimizing conditions for the tempering at low temperatures to release residual stress and lattice strain occurred as a result of quench hardening.

The tensile strength of such a steel material should be increased in order not only to be resistant to rupture at a higher stress but also to begin to deform at a higher stress, namely to have an increased yield strength. The yield strength of materials may vary from microstructure to microstructure even through they have an identical tensile strength. Most of reinforcing members of automobiles have a martensite microstructure as a result of a heat treatment such as induction hardening.

The structure under this condition, however, is considered to be a structure which has a high residual stress and a high lattice strain due to quenching in quench hardening, has a high mobile dislocation, and is likely to deform upon the application of a load. Accordingly, a material having a martensite microstructure as a quenched structure has a low yield strength at which the material begins to deform, although it has a high tensile strength. Thus, the material has a low yield ratio which is represented by the ratio of the yield strength to the tensile strength.

The material having a structure under this condition has a high residual stress and a high lattice strain inside thereof and thereby absorbs less energy upon impact at low temperatures. Specifically, the material has poor low-temperature toughness, and a member made from the material may be likely to be damaged when an impact load is applied at low temperatures typically in cold regions.

The present inventors have found that it is very effective to carry out tempering at low temperatures in order to improve these insufficient properties. Specifically, the tempering at low temperatures causes excessive dissolved carbon in martensite to precipitate and disperse as fine iron carbide precipitates. The fine precipitates serve to inhibit the moving of dislocations occurring upon application of a load. The member composed of this material has an increased yield strength and thereby has an increased yield ratio. As a result, the member has an increased maximum load at which local buckling occurs upon the application of a bending load, namely it has an increased crushing strength. In addition, the member can absorb larger energy upon impact. It also has an improved toughness and absorbs greater energy upon impact at low testing temperatures, because residual stress and lattice strain occurred as a result of quench hardening are released.

There are proper ranges of the temperature and duration of tempering, because these parameters affect the precipitation of carbides upon tempering. If the tempering temperature is excessively low, carbide precipitates may not form sufficiently and may fail to cause sufficiently increased strength. The resulting steel has an insufficient toughness and thereby has an insufficient impact resistance although it has a high tensile strength equivalent to that in a quenched steel, because the toughness is significantly affected upon quench hardening. In contrast, if the tempering temperature is excessively high, carbide precipitates may grow excessively, thereby become less inhibitory to the moving of dislocations, and this may cause a reduced yield strength. A steel under this condition absorbs less shock (impact) because it has a low strength. However, this steel excels in impact resistance, because it has a significantly improved toughness.

Based on these findings, the present invention has been made. Specifically, according to another embodiment of the present invention, there is provided a method of manufacturing the above-mentioned high-strength electric resistance welded steel pipe. This method is a method of manufacturing an electric resistance welded steel pipe having a tensile strength of 1750 N/mm$^2$ or more, a 0.1%-proof stress of 1320 N/mm$^2$ or more, and a Charpy impact value at a testing temperature of minus 40° C. of 50 J/cm$^2$ or more. The method includes the steps of carrying out electric resistance welding of a steel sheet having the above-specified chemical composition to form a steel pipe; heating the steel pipe to a temperature equal to or higher than an Ac$_3$ transformation temperature and equal to or lower than 950° C. and quenching the heated steel pipe at a rate of 100° C. per second or more in an induction hardening step; and heating the steel pipe after the induction hardening step to a temperature ranging from 100° C. to 250° C., holding the steel pipe at this temperature for 1 minute to 60 minutes, and cooling the steel pipe in a tempering step.

According to an embodiment of the present invention, an electric resistance welded steel pipe having such a chemical composition as to ensure a high tensile strength and a high yield strength (0.1%-proof stress) is sequentially subjected to induction hardening and low-temperature tempering. The resulting steel pipe has satisfactory properties of a tensile strength of 1750 N/mm$^2$ or more and a 0.1%-proof stress of 1320 N/mm$^2$ or more. Thus, there is provided a high-strength electric resistance welded steel pipe, which is resistant to local buckling even under high loads upon bending deformation and excels in shock absorptivity. According to another embodiment, there is also provided a high-strength electric resistance welded steel pipe, which shows a high absorbed energy (Charpy impact value) of 50 J/cm$^2$ or more in an impact test at minus 40° C., gives a fracture surface without brittle fracture appearance, and excels also in toughness.

DETAILED DESCRIPTION OF THE PREFERRED EMBODIMENTS

Figure 1A:
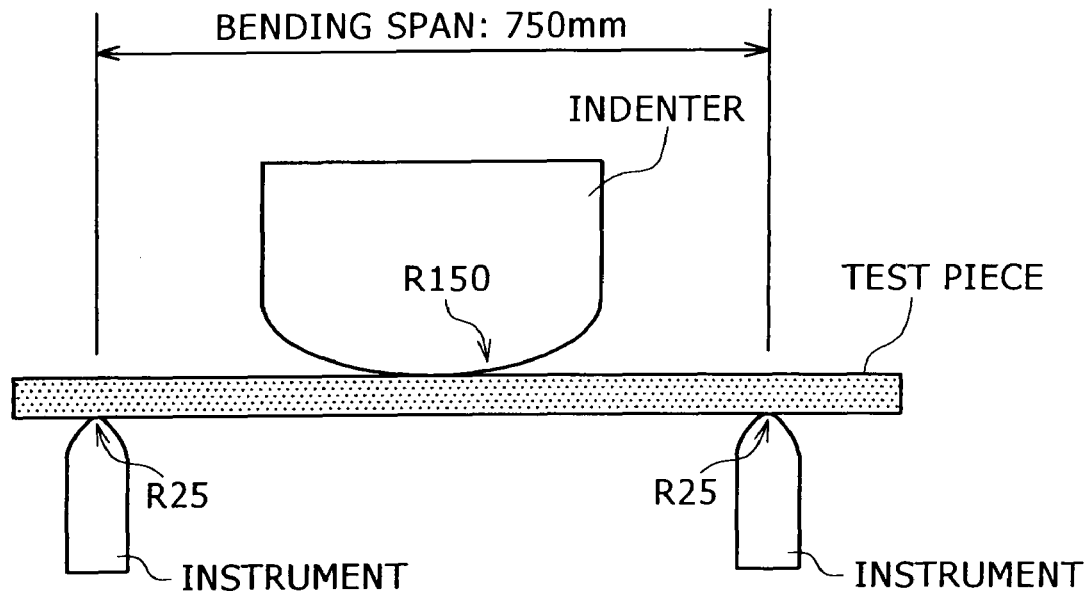
FIG. 1A is a diagram schematically illustrating how a three-point bending test is carried out.

High-strength electric resistance welded steel pipes for automobiles and methods of manufacturing them according to embodiments of the present invention will be illustrated in detail below.

High-strength Electric Resistance Welded Steel Pipes for Automobiles

Chemical Composition

As is described above, a high-strength electric resistance welded steel pipe for automobiles according to an embodiment of the present invention has a specific chemical composition of the steel so as to have a high tensile strength, a high shock absorptivity, and excellent impact properties at low temperatures. Reasons for specifying the chemical composition of the steel within the above-specified ranges will be initially illustrated.

Carbon (C) Content: 0.2 to 0.4 percent by mass

The steel pipe is desirably reinforced by the action of a tempered martensite microstructure. Alloy elements in the steel affect the strength of such tempered martensite, of which the carbon most significantly affects the strength. Carbon (C) element forms low-temperature transformation structures, such as martensite, precipitates fine iron carbide precipitates during tempering, and thereby increases the strength and yield strength of the steel pipe. The carbon content should be 0.2 percent by mass or more to obtain a high-strength of 1750 N/mm$^2$ or more. It is more preferably 0.22 percent by mass or more, and furthermore preferably 0.24 percent by mass or more. However, an excessively high carbon content may cause reduced ductility and toughness, although it increases strength. The carbon content is therefore should be 0.4 percent by mass or less. It is preferably 0.35 percent by mass or less, and more preferably 0.32 percent by mass or less.

Silicon (Si) Content: 0.05 to 0.5 percent by mass

Silicon (Si) element deoxidizes the steel, effectively increases hardenability, and causes solid-solution strengthening of the steel to have satisfactory strength without adversely affecting ductility. This element is also very effective to discharge oxides in welded portions to retain soundness of the steel, upon manufacturing of the steel pipe by electric resistance welding. The silicon content should be 0.05 percent by mass or more to yield such advantages. It is preferably 0.1 percent by mass or more, and more preferably 0.15 percent by mass or more. However, an excessively high silicon content may adversely affect the surface quality and toughness of the steel pipe. The silicon content should therefore be 0.5 percent by mass or less. It is preferably 0.4 percent by mass or less, and more preferably 0.35 percent by mass or less.

Manganese (Mn) Content: 0.5 to 2.5 percent by mass

Manganese (Mn) element very effectively lowers the martensite transformation temperature and increases hardenability of the steel so as to yield high strength stably. The manganese content should be 0.5 percent by mass or more to exhibit these advantages stably. It is preferably 0.8 percent by mass or more, and more preferably 1.0 percent by mass or more. However, when manganese is added in an excessively high content, the advantages may be saturated and segregation may occur to give a non-uniform structure. The upper limit of the manganese content should therefore be 2.5 percent by mass. The manganese content is preferably 2 percent by mass or less, and more preferably 1.5 percent by mass or less.

Phosphorus (P) Content: 0.025 percent by mass or less

Phosphorus (P) element very effectively causes solid-solution strengthening without adversely affecting ductility of the steel. However, this element is likely to segregate at grain boundaries, thereby reduces grain boundary strength and toughness, and elevates the fracture appearance transition temperature. The phosphorus content should therefore be 0.025 percent by mass or less, and is preferably 0.020 percent by mass or less, and more preferably 0.015 percent by mass or less. However, it is industrially difficult to make the phosphorus content 0 percent by mass.

Sulfur (S) Content: 0.01 percent by mass or less

A large amount of sulfur (S) may increase sulfide inclusions and thereby cause deterioration in toughness and soundness of welded portions. The sulfur content should therefore be 0.01 percent by mass or less. It is preferably 0.008 percent by mass or less, and more preferably 0.005 percent by mass or less. However, it is industrially difficult to make the sulfur content 0 percent by mass.

Aluminum (Al) Content: 0.01 to 0.15 percent by mass

Aluminum (Al) element acts as a deoxidizer in melting and effectively increases the cleanliness of the steel. For exhibiting these advantages, the aluminum content is preferably, for example, 0.01 percent by mass or more, more preferably 0.02 percent by mass or more, and furthermore preferably 0.03 percent by mass or more. However, an excessively high aluminum content may cause large amounts of inclusions in the steel, thereby adversely affect the cleanliness of the steel and cause surface defects. The aluminum content should therefore be 0.15 percent by mass or less. It is preferably 0.1 percent by mass or less, and more preferably 0.08 percent by mass or less.

Copper (Cu) Content: 0.01 to 2 percent by mass

Copper (Cu) element finely divides formed rust, thereby reduces the corrosion speed of the steel in an atmospheric environment, and improves delayed fracture resistance effectively. This element also effectively improves hardenability and thereby ensures high strength of the steel stably. For satisfactorily exhibiting these advantages, the copper content is preferably, for example, 0.01 percent by mass or more, more preferably 0.03 percent by mass or more, and furthermore preferably 0.05 percent by mass or more. However, excessive copper may cause embrittlement during hot rolling, and its content should therefore be 2 percent by mass or less. It is preferably 1.5 percent by mass or less, and more preferably 1 percent by mass or less. For further suppressing embrittlement during hot rolling, nickel (Ni) is preferably used in combination in a content of 50% to 100% the copper content.

Chromium (Cr) Content: 0.05 to 2 percent by mass

Chromium (Cr) element effectively increases hardenability of the steel. For satisfactory exhibiting these advantages, the chromium content is preferably, for example, 0.05 percent by mass or more, more preferably 0.1 percent by mass or more, and furthermore preferably 0.2 percent by mass or more. However, excessive chromium may frequently cause penetrators upon welding of the electric resistance welded steel pipe and thereby cause reduction in toughness thereof. The chromium content should therefore be 2 percent by mass or less, and is preferably 1.5 percent by mass or less, and more preferably 1 percent by mass or less.

Titanium (Ti) Content: 0.005 to 0.2 percent by mass

Titanium (Ti) element forms fine carbides, thereby finely divides crystal grains and suppresses grain growth. This element also acts as a trap site of diffusible hydrogen and lowers the susceptibility of the steel to hydrogen embrittlement. It also finely divides formed rust and thereby improves corrosion resistance. When the steel further contains boron (B) as mentioned below, titanium exhibits denitrification effects so as to make boron to ensure predetermined hardenability. For satisfactorily exhibiting these advantages, the titanium content is preferably, for example, 0.005 percent by mass or more, more preferably 0.01 percent by mass or more, and furthermore preferably 0.02 percent by mass or more. However, excessive titanium may cause coarse carbide grains and cause deterioration in toughness. The titanium content should therefore be 0.2 percent by mass or less. It is preferably 0.15 percent by mass or less, and more preferably 0.1 percent by mass or less.

Boron (B) Content: 0.0002 to 0.005 percent by mass

Boron (B) element significantly improves the hardenability of the steel. This element also effectively improves the toughness of a quenched structure. For satisfactorily exhibiting these advantages, the boron content is preferably, for example, 0.0002 percent by mass or more, more preferably 0.0005 percent by mass or more, and furthermore preferably 0.001 percent by mass or more. Excessive boron, however, may cause a multicomponent borocarbide represented by $Fe_{23}(C, B)_6$ in the steel, and the steel pipe may have decreased hardenability and fail to have a predetermined strength conversely. The boron content should therefore be 0.005 percent by mass or less. It is preferably 0.0045 percent by mass or less, and more preferably 0.004 percent by mass or less.

The steel for use herein has a basic chemical composition as above, with the remainder being substantially iron. It is naturally acceptable that the steel contains inevitable impurities derived typically from materials, sources, and manufacturing facilities.

If necessary, the ultrahigh-strength electric resistance welded steel pipe may further contain one or more element selected from the group consisting of Nb, V, Zr, Mo, Ni, and Ca, in addition to the above-mentioned elements.

Niobium (Nb) Content: 0.002 to 0.2 percent by mass

Niobium (Nb) element forms stable borocarbides, suppresses the formation of coarse crystal grains during quench hardening, and thereby inhibits deterioration of toughness, as with titanium. For satisfactorily exhibiting these advantages, the niobium content is preferably, for example, 0.002 percent by mass or more and is more preferably 0.005 percent by mass or more, and furthermore preferably 0.01 percent by mass or more. In contrast, when niobium is contained excessively, dissolved carbides may occur insufficiently in induction hardening in which the steel is heated in a short time, and this may reduce the carbon concentration of the matrix, and the resulting steel pipe may not have a sufficient strength. The niobium content should therefore be 0.2 percent by mass or less. It is preferably 0.15 percent by mass or less, and more preferably 0.1 percent by mass or less.

Vanadium (V) Content: 0.005 to 0.5 percent by mass

Vanadium (V) element forms stable borocarbides, suppresses the formation of coarse crystal grains during quench hardening, and thereby inhibits deterioration of toughness, as with titanium. For satisfactorily exhibiting these advantages, the vanadium content is preferably, for example, 0.005 percent by mass or more, more preferably 0.01 percent by mass or more, and furthermore preferably 0.02 percent by mass or more. In contrast, when vanadium is contained excessively, dissolved carbides may occur insufficiently in induction hardening in which the steel is heated in a short time, and this may reduce the carbon concentration of the matrix, and the resulting steel pipe may not have a sufficient strength. The vanadium content should therefore be 0.5 percent by mass or less. It is preferably 0.3 percent by mass or less, and more preferably 0.2 percent by mass or less.

Zirconium (Zr) Content: 0.005 to 0.5 percent by mass

Zirconium (Zr) element forms stable borocarbides, suppresses the formation of coarse crystal grains during quench hardening, and thereby inhibits deterioration of toughness, as with titanium. For satisfactorily exhibiting these advantages, the zirconium content is preferably, for example, 0.005 percent by mass or more, more preferably 0.01 percent by mass or more, and furthermore preferably 0.02 percent by mass or more. In contrast, when zirconium is contained excessively, dissolved carbides may occur in sufficiently in induction hardening in which the steel is heated in a short time, and this may reduce the carbon concentration of the matrix, and the resulting steel pipe may not have a sufficient strength. The zirconium content should therefore be 0.5 percent by mass or less. It is preferably 0.4 percent by mass or less, and more preferably 0.3 percent by mass or less.

Molybdenum (Mo) Content: 0.02 to 1 percent by mass

Molybdenum (Mo) element effectively improves the hardenability of the steel. The addition of molybdenum provides a steel having a further higher strength without increasing the content of carbon that adversely affects delayed fracture resistance. For satisfactorily exhibiting these advantages, the molybdenum content is preferably, for example, 0.02 percent by mass or more, more preferably 0.05 percent by mass or more, and furthermore preferably 0.1 percent by mass or more. However, excessive molybdenum may cause deterioration of ductility and increase manufacturing cost, because it is an expensive element. The molybdenum content should therefore be 1 percent by mass or less. It is preferably 0.8 percent by mass or less, and more preferably 0.6 percent by mass or less.

Nickel (Ni) Content: 0.05 to 3 percent by mass

Nickel (Ni) element very effectively increases the hardenability of the steel, increases bonding energy between iron atoms to thereby increase the strength while suppressing the deterioration of toughness. In addition, this element finely divides formed rust to thereby improve corrosion resistance of the steel. For satisfactorily exhibiting these advantages, the nickel content is preferably, for example, 0.05 percent by mass or more, more preferably 0.1 percent by mass or more, and furthermore preferably 0.2 percent by mass or more. However, excessive nickel addition may cause increased cost of the steel material. The nickel content should therefore be 3 percent by mass or less. It is preferably 2.5 percent by mass or less, and more preferably 2 percent by mass or less.

Calcium (Ca) Content: 0.0005 to 0.005 percent by mass

Calcium (Ca) element forms spherical sulfides and thereby improves processability of the steel. For satisfactorily exhibiting these advantages, the calcium content is preferably, for example, 0.0005 percent by mass or more. However, excessive calcium addition causes an increased cost, and the advantages of calcium addition may be saturated. The calcium content should therefore be 0.005 percent by mass or less. It is preferably 0.004 percent by mass or less, and more preferably 0.003 percent by mass or less.

Tensile Strength: 1750 N/mm$^2$ or more

The tensile strength of a steel pipe for use as door impact beams and other reinforcing members of automobiles should be 1750 N/mm$^2$ or more, and is preferably 1765 N/mm$^2$ or more, and more preferably 1800 N/mm$^2$ or more.

0.1%-Proof Stress: 1320 N/mm$^2$ or more

A stress at which 0.2% permanent strain occurs, namely, a 0.2%-proof stress has been generally used as a yield strength as defined in Japanese Industrial Standards (JIS). However, the shock absorptivity of a steel pipe used as a shock absorbing member of automobiles may be underestimated when it is evaluated based on a yield ratio using the 0.2%-proof stress specified in JIS, because the steel pipe used as a shock absorbing member absorbs considerable impact energy before 0.2% permanent strain occurs. Accordingly, the absorbed energy of a steel pipe for use typically as an automobile door impact beam can be more appropriately evaluated based on a 0.1%-proof stress, and the 0.1%-proof stress is employed herein for the evaluation of the yield strength.

The 0.1%-proof stress is relatively low in a quenched martensite microstructure. However, when a steel pipe is subjected typically to tempering at low temperatures, the yield strength increases and the crushing strength increases by the action of fine precipitates. For exhibiting satisfactorily increased crushing strength, the 0.1%-proof stress should be 1320 N/mm$^2$ or more. It is preferably 1360 N/mm$^2$ or more, and more preferably 1400 N/mm$^2$ or more.

Charpy Impact Value at Minus 40° C.: 50 J/cm$^2$ or more

An absorbed energy determined in a Charpy impact test varies depending on the sheet thickness of a test piece. JIS No. 4 test pieces specified according to JIS are test pieces with 2 mm-V-shaped notches, and standard test pieces have sheet thicknesses of 10 mm, 7.5 mm, 5 mm, and 2.5 mm. In actual impact tests, the sheet thickness of a test piece varies depending on the sheet thickness of a tested product. An absorbed energy (Charpy impact value) per unit area is employed herein in view of the influence of the sheet thickness.

The Charpy impact value at minus 40° C. of 50 J/cm² or more as specified herein is such a Charpy impact value that brittle fracture appearance does not occur in a fracture surface of a test piece when the test piece is subjected to a Charpy impact test at a test piece temperature of minus 40° C. If the Charpy impact value is less than 50 J/cm², a brittle fracture appearance may occur in a fracture surface. When the Charpy impact value is 50 J/cm² or more, most of the fracture surface shows ductile fracture.

Method of Manufacturing High-strength Electric Resistance Welded Steel Pipe for Automobiles Manufacture of Hot-Rolled Steel Sheet Initially, a steel having the above-specified chemical composition is made, formed in to a slab, and the slab is subjected to hot rolling. The hot rolling may be carried out at a heating temperature of the slab of, for example, 1100° C. or higher and a coiling temperature of 650° C. or lower. It is desirable to prevent the rolling temperature of a steel sheet for a steel pipe of the present invention from being excessively low, because the steel sheet is likely to receive a high rolling load during hot rolling. Accordingly, the heating temperature of the slab is preferably 1100° C. or higher, more preferably 1150° C. or higher, and furthermore preferably 1200° C. or higher.

The heating procedure in hot rolling is not particularly limited and includes, for example, a direct rolling procedure in which a continuously cast slab is directly subjected to rolling; and a reheating procedure in which a slab which has been mildly heated is reheated, or a heated slab which has been once cooled is reheated. However, heating at a temperature exceeding 1300° C. may waste heat energy and give no additional advantages.

Conditions for the hot rolling of the slab are not particularly limited and can be common hot rolling conditions. However, the finish delivery temperature in hot rolling is preferably a temperature equal to or higher than an $Ac_3$ transformation temperature where an austenite single phase occurs. For satisfactorily removing scale on the surface of the rolled steel sheet, the coiling temperature is preferably 650° C. or lower, more preferably 620° C. or lower, and furthermore preferably 600° C. or lower.

However, if the coiling temperature is excessively low, low-temperature transformation structures such as bainite and martensite may occur, and the steel sheet may have an excessively high strength and it may be difficult to form the steel sheet into a pipe. Accordingly, the coiling temperature is preferably 450° C. or higher, more preferably 480° C. or higher, and furthermore preferably 500° C. or higher. A hot-rolled steel sheet manufactured under these conditions has a strength of about 390 N/mm² to 690 N/mm² which is a strength level of a regular electric resistance welded steel pipe. The hot-rolled steel sheet can be formed into a pipe under conditions as with a regular hot-rolled steel sheet.

Formation of Electric Resistance Welded Steel Pipe

The hot-rolled steel sheet (steel sheet in coil) is subjected to removal of surface scale by a procedure such as pickling, grinding, or shot blasting, is then slit to a predetermined width, and is formed into an electric resistance welded steel pipe through electric resistance welding. The electric resistance welding may be carried out using a common high-frequency induction resistance welding machine.

The electric resistance welded steel pipe after welding has a circular cross-section and may be used as intact. This is advantageous in cost and workability in heat treatment. However, the steel pipe may be processed into a rectangular steel pipe having a rectangular cross-section in some uses.

Quench Hardening of Electric Resistance Welded Steel Pipe

The electric resistance welded steel pipe is subjected to quench hardening as a heat treatment for yielding desired properties. In the quench hardening, portions of the steel pipe are sequentially heated for a short time and then cooled with water jet. The induction hardening is advantageous to give an electric resistance welded steel pipe with less dimensional deformation upon heat treatment and with excellent dimensional properties.

In the induction hardening, the steel pipe is heated to a temperature equal to or higher than an $Ac_3$ transformation temperature and equal to or lower than 950° C., and thereafter cooled to ordinary temperature at a cooling rate of 100° C. per second or more. This range of cooling rate is preferred to yield a target martensite microstructure. The cooling may be carried out, for example, through water cooling.

If the heating temperature is lower than the $Ac_3$ transformation temperature and falls within two-phase temperatures between the $Ac_1$ and $Ac_3$ transformation temperatures, the steel includes austenite and ferrite at this temperature, of which austenite transforms into martensite and hardens, but the remainder ferrite does not harden. The resulting quenched structure may include a mixture of hard martensite and soft ferrite and may fail to have a desired structure even after quench hardening and to have a desired strength. The heating temperature is therefore preferably equal to or higher than the $Ac_3$ transformation temperature and is more preferably higher than the $Ac_3$ transformation temperature by 30° C. or more.

In contrast, if the heating temperature exceeds 950° C., austenite grains may become coarse upon heating, and this may reduce the toughness of the quenched steel. As a result, it may be difficult to obtain satisfactory absorbed energy at a predetermined testing temperature. The heating temperature in quench hardening is therefore preferably 950° C. or lower, and more preferably 920° C. or lower.

Tempering of Electric Resistance Welded Steel Pipe

The quenched steel pipe is subjected to tempering to give desired properties. The martensite microstructure obtained by quench hardening has a lower yield strength even at the same tensile strength, thereby undergoes local buckling under a smaller load in earlier stages, and has a lower shock absorptivity. Tempering of this quenched steel pipe at low temperatures gives a steel pipe with high yield strength, which includes fine and uniformly dispersed iron carbide precipitates and thereby has a high yield strength. The resulting steel pipe also has a recovered low-temperature toughness, because internal residual stress and lattice strain occurred as a result of quench hardening are relaxed and released.

The tempering is carried out at a temperature of 100° C. or higher and 250° C. or lower. If the tempering temperature is lower than 100° C., iron carbide may insufficiently precipitate and it may be difficult to obtain a desired yield strength. Accordingly, the tempering temperature is preferably 100° C. or higher, more preferably 120° C. or higher, and furthermore preferably 140° C. or higher. In contrast, if the tempering temperature exceeds 250° C., carbide precipitates may excessively grow to reduce the yield strength, and it may be difficult to obtain a desired yield strength. Accordingly, the tempering temperature is preferably 250° C. or lower, more preferably 230° C. or lower, and furthermore preferably 210° C. or lower.

The period (holding period) of holding the electric resistance welded steel pipe at the tempering temperature is, for example, 1 minute or more and 60 minutes or less. If the holding period is as short as less than 1 minute, it may be too short for carbon in martensite to diffuse sufficiently, the resulting precipitates may be insufficient, and it may be difficult to give a desired yield strength. The holding period is therefore, preferably 1 minute or more, more preferably 3 minutes or more, and furthermore preferably 5 minutes or more. In contrast, if the holding period (soaking period) exceeds 60 minutes, precipitates may be excessive, and tensile strength may be reduced. In addition, such a long heat treatment period may reduce productivity. The holding period in tempering is preferably 60 minutes or less, more preferably 30 minutes or less, and furthermore preferably 20 minutes or less.

The tempering procedure is not particularly limited, and, for example, an electric furnace or an atmosphere furnace whose temperature can be easily controlled may be used.

The present invention will be illustrated in further detail with reference to several experimental examples below. It should be noted, however, that these experimental examples are not intended to limit the scope of the present invention, and various alternations and modifications may be made without departing the scope and spirit of the present invention.

EXPERIMENTAL EXAMPLES

Slabs having the chemical compositions in Table 1 were heated to 1250° C. and hot-rolled under the conditions in Tables 2 and 3 into hot-rolled steel sheets each having a sheet thickness of 2.0 mm. These hot-rolled steel sheets were pickled to remove surface scale and made into electric resistance welded steel pipes each having an outer diameter of 31.8 mm and a wall thickness of 2.0 mm. All the steel pipes were subjected to induction hardening in which the steel pipes were heated to 900±20° C. in an induction hardening system and cooled with water jet from this temperature.

Subsequent to the quench hardening, they were subjected to low-temperature tempering under the conditions in Tables 2 and 3. Test pieces were sampled from the steel pipes after the low-temperature tempering, and the yield strengths (0.1%-proof stress), tensile strengths, and impact resistances of them were measured in the following manner. Yield ratios were calculated as the ratios of the yield strength to the tensile strength. Tables 2 and 3 also show Charpy impact values measured in Charpy impact tests, shock absorptivities in three-point bending tests as illustrated in FIG. 1, and the results in delayed fracture tests.

TABLE 1

| Steel No. | C | Si | Mn | P | S | Cu | Al | Cr | Ti | B | Others |
|---|---|---|---|---|---|---|---|---|---|---|---|
| Steel 1 | 0.23 | 0.21 | 1.31 | 0.005 | 0.002 | 0.05 | 0.043 | 0.22 | 0.027 | 0.0026 | |
| Steel 2 | 0.28 | 0.21 | 1.23 | 0.005 | 0.002 | 0.08 | 0.041 | 0.22 | 0.026 | 0.0027 | |
| Steel 3 | 0.28 | 0.20 | 1.29 | 0.005 | 0.001 | 0.10 | 0.042 | 0.22 | 0.033 | 0.0025 | Ni: 0.50 |
| Steel 4 | 0.28 | 0.20 | 1.29 | 0.005 | 0.001 | 0.13 | 0.043 | 0.21 | 0.023 | 0.0026 | Ni: 1.0 |
| Steel 5 | 0.29 | 0.21 | 1.29 | 0.005 | 0.001 | 0.11 | 0.043 | 0.50 | 0.028 | 0.0026 | |
| Steel 6 | 0.28 | 0.21 | 1.30 | 0.005 | 0.002 | 0.14 | 0.043 | 1.00 | 0.022 | 0.0025 | |
| Steel 7 | 0.29 | 0.21 | 1.31 | 0.005 | 0.002 | 0.09 | 0.043 | 0.22 | 0.026 | 0.0027 | Mo: 0.25 |
| Steel 8 | 0.28 | 0.20 | 1.32 | 0.005 | 0.002 | 0.15 | 0.041 | 0.22 | 0.026 | 0.0026 | Mo: 0.75 |
| Steel 9 | 0.28 | 0.21 | 1.29 | 0.005 | 0.001 | 0.13 | 0.041 | 0.21 | 0.100 | 0.0026 | Nb: 0.028 |
| Steel 10 | 0.25 | 0.21 | 1.29 | 0.005 | 0.001 | 0.50 | 0.042 | 1.00 | 0.026 | 0.0029 | Ni: 0.51 |
| Steel 11 | 0.25 | 0.21 | 1.29 | 0.005 | 0.001 | 0.25 | 0.042 | 1.00 | 0.026 | 0.0029 | Ni: 1.0 |
| Steel 12 | 0.28 | 0.20 | 1.31 | 0.005 | 0.001 | 0.11 | 0.042 | 0.22 | 0.027 | 0.0029 | Zr: 0.1, Ca: 0.0020 |
| Steel 13 | 0.28 | 0.20 | 1.30 | 0.005 | 0.001 | 0.10 | 0.042 | 0.21 | 0.026 | 0.0029 | Nb: 0.10 |
| Steel 14 | 0.28 | 0.21 | 1.31 | 0.005 | 0.001 | 0.13 | 0.044 | 0.23 | 0.027 | 0.0030 | V: 0.20 |
| Steel 15 | 0.28 | 0.21 | 1.31 | 0.005 | 0.001 | 0.10 | 0.044 | 0.23 | 0.027 | 0.0030 | Nb: 0.032, V: 0.031 |
| Steel 16 | 0.28 | 0.21 | 1.30 | 0.005 | 0.001 | 1.00 | 0.046 | 0.22 | 0.027 | 0.0027 | Ni: 0.50, Ca: 0.0025 |
| Steel 17 | 0.30 | 0.26 | 1.31 | 0.009 | 0.002 | 0.09 | 0.038 | 0.25 | 0.038 | 0.0040 | |
| Steel 18 | 0.32 | 0.24 | 1.35 | 0.018 | 0.002 | 0.10 | 0.037 | 0.27 | 0.036 | 0.0045 | Ni: 2.0 |
| Steel 19 | 0.28 | 0.20 | 1.25 | 0.010 | 0.002 | 0.12 | 0.038 | 0.22 | 0.021 | 0.0025 | Nb: 0.035, V: 0.035, Zr: 0.1, Ca: 0.0015 |
| Steel 20 | 0.25 | 0.21 | 1.23 | 0.009 | 0.004 | 0.15 | 0.042 | 0.17 | 0.023 | 0.0030 | Nb: 0.035, V: 0.035, Zr: 0.05, Ni: 0.5, Mo: 0.25, Ca: 0.0015 |
| Steel 21 | 0.17 | 0.18 | 1.28 | 0.010 | 0.002 | 0.07 | 0.045 | 0.21 | 0.025 | 0.0026 | |
| Steel 22 | 0.45 | 0.20 | 1.10 | 0.015 | 0.002 | 0.01 | 0.040 | 0.19 | 0.025 | 0.0028 | |
| Steel 23 | 0.25 | 0.70 | 1.15 | 0.008 | 0.001 | 0.05 | 0.035 | 0.25 | 0.003 | 0.0028 | |
| Steel 24 | 0.27 | 0.20 | 3.00 | 0.011 | 0.004 | 0.01 | 0.030 | 0.18 | 0.035 | 0.0030 | |
| Steel 25 | 0.25 | 0.80 | 0.45 | 0.011 | 0.005 | 0.07 | 0.045 | 0.22 | 0.023 | 0.0025 | |
| Steel 26 | 0.27 | 0.27 | 1.16 | 0.009 | 0.001 | 0.01 | 0.038 | 0.02 | 0.002 | 0.0001 | |

The numerals are indicated by percent by mass.

TABLE 2

| Sample No. | Steel No. | Finishing delivery temperature in rolling (° C.) | Coiling temperature (° C.) | Tempering temperature (° C.) | Holding period in tempering (min) | 0.1%-Proof stress (yield strength) (N/mm$^2$) | Tensile strength (N/mm$^2$) | Yield ratio (%) | Low-temperature Charpy impact value 'vE$_{-40}$ (J/cm$^2$) | Crushing strength (kN) | Shock absorptivity (kJ) | Delayed fracture resistance |
|---|---|---|---|---|---|---|---|---|---|---|---|---|
| 1 | Steel 1 | 880 | 550 | — | — | 1346.9 | 1903.1 | 70.8 | 49.4 | 16.4 | 1.26 | Good |
| 2 | Steel 1 | 880 | 550 | 100 | 20 | 1459.8 | 1871.0 | 78.0 | 62.5 | 17.5 | 1.81 | Good |
| 3 | Steel 1 | 880 | 550 | 150 | 10 | 1456.7 | 1816.8 | 80.2 | 78.8 | 18.3 | 1.78 | Good |
| 4 | Steel 1 | 880 | 550 | 200 | 5 | 1504.1 | 1778.2 | 84.6 | 88.3 | 18.9 | 1.92 | Good |
| 5 | Steel 1 | 880 | 550 | 250 | 10 | 1331.0 | 1641.4 | 81.1 | 85.0 | 16.5 | 1.88 | Good |
| 6 | Steel 2 | 880 | 550 | — | — | 1385.0 | 1978.6 | 70.0 | 45.0 | 17.3 | 1.28 | Good |
| 7 | Steel 2 | 880 | 550 | 100 | 10 | 1557.4 | 1984.0 | 78.5 | 56.4 | 19.2 | 1.76 | Good |
| 8 | Steel 2 | 880 | 550 | 150 | 15 | 1507.0 | 1902.6 | 79.2 | 71.3 | 18.5 | 1.84 | Good |

TABLE 2-continued

| Sample No. | Steel No. | Finishing delivery temperature in rolling (° C.) | Coiling temperature (° C.) | Tempering temperature (° C.) | Holding period in tempering (min) | 0.1%-Proof stress (yield strength) (N/mm$^2$) | Tensile strength (N/mm$^2$) | Yield ratio (%) | Low-temperature Charpy impact value 'vE$_{-40}$ (J/cm$^2$) | Crushing strength (kN) | Shock absorp- tivity (kJ) | Delayed fracture resistance |
|---|---|---|---|---|---|---|---|---|---|---|---|---|
| 9  | Steel 2  | 880 | 550 | 200 | 3  | 1579.2 | 1820.1 | 86.8 | 93.8 | 19.2 | 1.92 | Good |
| 10 | Steel 2  | 880 | 550 | 250 | 5  | 1480.7 | 1774.6 | 83.4 | 83.8 | 18.3 | 1.85 | Good |
| 11 | Steel 3  | 880 | 550 | 150 | 10 | 1526.4 | 1908.3 | 80.0 | 93.5 | 19.2 | 1.78 | Good |
| 12 | Steel 4  | 880 | 550 | 150 | 10 | 1554.9 | 1980.9 | 78.5 | 89.4 | 19.4 | 1.83 | Good |
| 13 | Steel 5  | 880 | 550 | 150 | 10 | 1474.3 | 1830.4 | 80.5 | 77.3 | 18.2 | 1.78 | Good |
| 14 | Steel 6  | 900 | 580 | 150 | 10 | 1521.9 | 1880.6 | 80.9 | 72.4 | 19.3 | 1.72 | Good |
| 15 | Steel 7  | 900 | 580 | 150 | 10 | 1509.4 | 1910.6 | 79.0 | 67.5 | 18.7 | 1.81 | Good |
| 16 | Steel 8  | 900 | 580 | 150 | 15 | 1560.2 | 1950.3 | 80.0 | 71.2 | 19.2 | 1.85 | Good |
| 17 | Steel 9  | 900 | 580 | 150 | 15 | 1494.7 | 1853.4 | 80.6 | 86.4 | 18.3 | 1.79 | Good |
| 18 | Steel 10 | 900 | 580 | 150 | 15 | 1432.2 | 1804.3 | 79.4 | 69.3 | 17.9 | 1.81 | Good |
| 19 | Steel 11 | 900 | 550 | —   | —  | 1404.9 | 1974.6 | 71.1 | 45.3 | 17.2 | 1.18 | Good |
| 20 | Steel 11 | 900 | 550 | 150 | 10 | 1505.5 | 1872.2 | 80.4 | 71.3 | 18.9 | 1.81 | Good |
| 21 | Steel 12 | 900 | 550 | —   | —  | 1415.2 | 2029.4 | 69.7 | 45.9 | 17.6 | 1.23 | Good |
| 22 | Steel 12 | 900 | 550 | 150 | 10 | 1546.7 | 1909.8 | 81.0 | 68.3 | 19.5 | 1.91 | Good |
| 23 | Steel 13 | 880 | 580 | —   | —  | 1399.1 | 1970.8 | 71.0 | 48.1 | 17.6 | 1.25 | Good |
| 24 | Steel 13 | 880 | 580 | 100 | 15 | 1498.0 | 1987.5 | 75.4 | 58.1 | 18.8 | 1.78 | Good |
| 25 | Steel 13 | 880 | 580 | 150 | 3  | 1554.5 | 1891.9 | 82.2 | 64.4 | 19.2 | 1.82 | Good |
| 26 | Steel 13 | 880 | 580 | 200 | 3  | 1579.2 | 1843.9 | 85.6 | 74.4 | 19.8 | 1.93 | Good |
| 27 | Steel 13 | 880 | 580 | 250 | 5  | 1507.4 | 1765.8 | 85.4 | 75.0 | 18.2 | 1.88 | Good |
| 28 | Steel 14 | 900 | 580 | —   | —  | 1385.8 | 2010.7 | 68.9 | 45.6 | 15.2 | 1.19 | Good |
| 29 | Steel 14 | 900 | 580 | 100 | 20 | 1486.7 | 1972.8 | 75.4 | 66.9 | 18.9 | 1.81 | Good |
| 30 | Steel 14 | 900 | 580 | 150 | 8  | 1543.6 | 1914.5 | 80.6 | 74.4 | 19.5 | 1.88 | Good |

TABLE 3

| Sample No. | Steel No. | Finishing delivery temperature in rolling (° C.) | Coiling temperature (° C.) | Tempering temperature (° C.) | Holding period in tempering (min) | 0.1%-Proof stress (yield strength) (N/mm$^2$) | Tensile strength (N/mm$^2$) | Yield ratio (%) | Low-temperature Charpy impact value 'vE$_{-40}$ (J/cm$^2$) | Crushing strength (kN) | Shock absorp- tivity (kJ) | Delayed fracture resistance |
|---|---|---|---|---|---|---|---|---|---|---|---|---|
| 31 | Steel 14 | 900 | 580 | 200 | 5  | 1583.7 | 1858.6 | 85.2 | 94.4 | 19.4 | 1.74 | Good |
| 32 | Steel 14 | 900 | 580 | 250 | 10 | 1393.4 | 1730.1 | 80.5 | 89.4 | 17.5 | 1.86 | Good |
| 33 | Steel 15 | 880 | 550 | —   | —  | 1383.4 | 1977.3 | 70.0 | 49.3 | 14.8 | 1.23 | Good |
| 34 | Steel 15 | 880 | 550 | 100 | 15 | 1501.3 | 1968.5 | 76.3 | 68.6 | 18.7 | 1.85 | Good |
| 35 | Steel 15 | 880 | 550 | 150 | 15 | 1533.6 | 1897.3 | 80.8 | 73.1 | 19.4 | 1.93 | Good |
| 36 | Steel 15 | 880 | 550 | 200 | 15 | 1534.3 | 1846.4 | 83.1 | 77.5 | 19.3 | 1.82 | Good |
| 37 | Steel 15 | 880 | 550 | 250 | 15 | 1488.5 | 1698.9 | 87.6 | 80.0 | 18.7 | 1.93 | Good |
| 38 | Steel 16 | 900 | 580 | —   | —  | 1402.5 | 2019.6 | 69.4 | 35.4 | 17.2 | 1.42 | Good |
| 39 | Steel 16 | 900 | 580 | 150 | 10 | 1521.2 | 1877.0 | 81.0 | 72.5 | 19.4 | 1.88 | Good |
| 40 | Steel 17 | 880 | 580 | —   | —  | 1300.2 | 2084.5 | 62.4 | 39.2 | 15.9 | 1.25 | Good |
| 41 | Steel 17 | 880 | 580 | 100 | 20 | 1466.9 | 2055.4 | 71.4 | 53.8 | 18.5 | 1.91 | Good |
| 42 | Steel 17 | 880 | 580 | 150 | 5  | 1482.5 | 1944.3 | 76.2 | 69.5 | 18.3 | 1.86 | Good |
| 43 | Steel 17 | 880 | 580 | 200 | 5  | 1493.2 | 1897.3 | 78.7 | 67.5 | 18.2 | 1.74 | Good |
| 44 | Steel 17 | 880 | 580 | 250 | 5  | 1453.3 | 1777.9 | 81.7 | 68.5 | 18.5 | 1.82 | Good |
| 45 | Steel 17 | 880 | 580 | 300 | 5  | 1372.2 | 1658.4 | 82.7 | 72.5 | 16.1 | 1.29 | Good |
| 46 | Steel 18 | 880 | 580 | —   | —  | 1310.7 | 2122.2 | 61.8 | 32.8 | 15.8 | 1.31 | Good |
| 47 | Steel 18 | 900 | 550 | 100 | 30 | 1572.3 | 2057.2 | 76.4 | 52.1 | 18.8 | 1.83 | Good |
| 48 | Steel 18 | 900 | 550 | 150 | 5  | 1527.8 | 1934.6 | 79.0 | 56.3 | 19.4 | 1.79 | Good |
| 49 | Steel 18 | 900 | 550 | 200 | 10 | 1490.5 | 1852.9 | 80.4 | 71.9 | 18.5 | 1.89 | Good |
| 50 | Steel 18 | 900 | 550 | 250 | 10 | 1350.8 | 1794.8 | 75.3 | 60.9 | 17.1 | 1.84 | Good |
| 51 | Steel 18 | 900 | 550 | 300 | 30 | 1300.8 | 1594.6 | 81.6 | 70.8 | 16.3 | 1.56 | Good |
| 52 | Steel 19 | 880 | 580 | 150 | 5  | 1548.2 | 1930.7 | 80.2 | 64.4 | 19.6 | 1.98 | Good |
| 53 | Steel 20 | 880 | 580 | 150 | 5  | 1553.9 | 1928.8 | 80.6 | 70.6 | 19.2 | 1.88 | Good |
| 54 | Steel 21 | 880 | 580 | 150 | 10 | 1371.5 | 1687.5 | 77.5 | 83.5 | 14.2 | 1.43 | Good |
| 55 | Steel 22 | 880 | 580 | 100 | 3  | 1221.5 | 2022.4 | 60.4 | 15.8 | 13.2 | 0.95 | Poor |
| 56 | Steel 23 | 880 | 580 | 150 | 15 | 1504.6 | 1897.5 | 79.3 | 45.2 | 18.3 | 1.25 | Good |
| 57 | Steel 24 | 880 | 580 | 100 | 10 | 1509.3 | 1965.2 | 76.8 | 15.1 | 14.8 | 0.98 | Poor |
| 58 | Steel 25 | 880 | 580 | 150 | 10 | 1298.3 | 1658.2 | 78.3 | 68.5 | 13.6 | 1.23 | Good |
| 59 | Steel 26 | 880 | 580 | 150 | 15 | 1383.6 | 1685.8 | 82.1 | 77.4 | 12.9 | 1.17 | Poor |

In the tensile tests, JIS No. 12A test pieces were used. In the impact tests, test pieces 2 mm thick with V-shaped notches sampled in an axial direction of steel pipes according to the JIS No. 4 test piece were used; on each sample, tests were conducted at a total of three times at a testing temperature of minus 40° C., and an average of three Charpy impact values was obtained. The V-shaped notches are perpendicular to the axial direction of steel pipes.

Figure 1B:
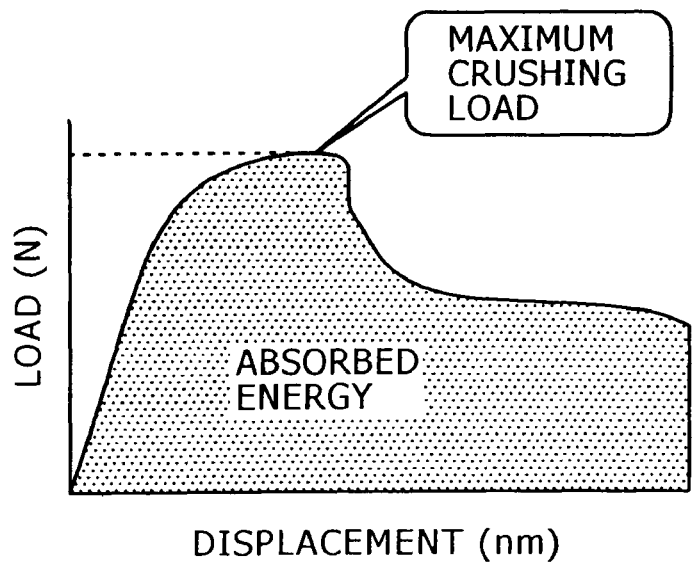
FIG. 1B is a graph showing a load-displacement curve.

In the three-point bending tests, an indenter with curvature of 150R was indented to 150 mm at a bending span of 750 mm as illustrated in FIG. 1A. A curve was plotted between the displacement (indentation of the indenter: from 0 to 150 mm) and the bending load on the indenter, namely, a load-displacement curve was plotted (FIG. 1B). A maximum crushing strength was read out from the curve, and an absorbed energy (kJ) was calculated from the area under the curve. The term "maximum crushing strength" means a maximum load at which a sample steel pipe undergoes local buckling and thereby deforms, and the load is reduced.

The delayed fracture resistance was determined in the following manner. A test piece in the form of steel pipe 300 mm long was cut out from a sample electric resistance welded steel pipe after induction hardening and low-temperature tempering, this test piece was immersed in a 100 mol/m³ aqueous hydrochloric acid solution for 300 hours, and whether the test piece after immersion showed hydrogen embrittlement cracking was visually observed. The delayed fracture resistance was evaluated depending on the presence or absence of the hydrogen embrittlement cracking. A sample showing no cracking was evaluated as "Good", and a sample showing cracking was evaluated as "Poor" in Tables 2 and 3.

Tables 2 and 3 demonstrate as follows. Samples having the above-specified chemical composition and prepared under the above-specified low-temperature tempering conditions each have a tensile strength of 1750 N/mm² or more and a 0.1%-proof stress of 1320 N/mm² or more, and concurrently have a Charpy impact value at a testing temperature of minus 40° C. of 50 j/cm² or more, indicating that they excel in impact properties at low temperatures.

Samples Nos. 1 to 53 use Steels Nos. 1 to 20 each having a chemical composition within the above-specified range. Among them, Samples Nos. 1, 6, 19, 21, 23, 28, 33, 38, 40, and 46 have not been subjected to low-temperature tempering as specified above and thereby fail to have a Charpy impact value within the above-specified range. Samples Nos. 45 and 51 have been subjected to tempering, but at a tempering temperature higher than the above-specified range. Sample No. 45 does not have a tensile strength within the above-specified range; and Sample No. 51 does not have both a tensile strength and a 0.1%-proof stress within the above-specified ranges.

Sample No. 54 uses Steel No. 21 as a steel material, but this steel material has a carbon content lower than the above-specified range. The sample fails to have a tensile strength within the above-specified range, even though it has been subjected to low-temperature tempering under the above-specified conditions.

Sample No. 55 uses Steel No. 22 as a steel material, but this steel material has a carbon content exceeding the above-specified range. The sample fails to have a 0.1%-proof stress within the above-specified range, even though it has been subjected to low-temperature tempering under the above-specified conditions.

Sample No. 56 uses Steel No. 23 as a steel material, but this steel material has a silicon content higher than the above-specified range. The sample fails to have a Charpy impact value within the above-specified range, even though it has been subjected to low-temperature tempering under the above-specified conditions.

Sample No. 57 uses Steel No. 24 as a steel material, but this steel material has a manganese content higher than the above-specified range. The sample fails to have a Charpy impact value within the above-specified range, even though it has been subjected to low-temperature tempering under the above-specified conditions.

Sample No. 58 uses Steel No. 25 as a steel material, but this steel material has a silicon content higher than the above-specified range and a manganese content lower than the above-specified range. The sample fails to have a tensile strength and a 0.1%-proof stress within the above-specified ranges, even though it has been subjected to low-temperature tempering under the above-specified conditions.

Sample No. 59 uses Steel No. 26 as a steel material, but this steel material has Cr, Ti, and B contents lower than the above-specified ranges. The sample fails to have a tensile strength within the above-specified range, even though it has been subjected to low-temperature tempering under the above-specified conditions.

Figure 2:
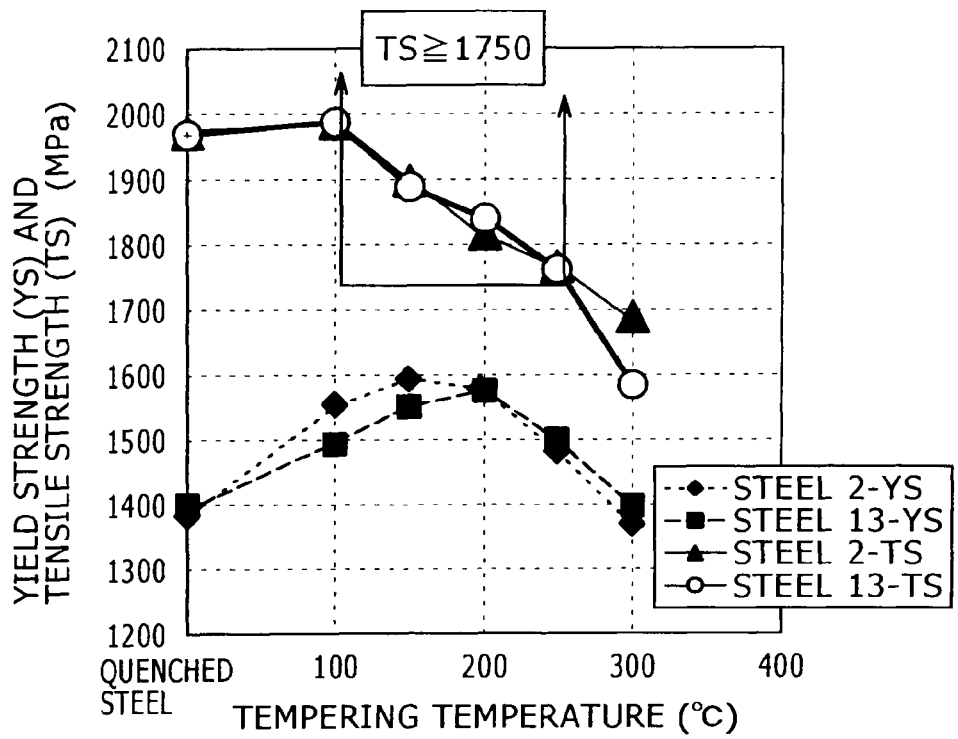
FIG. 2 is a graph showing how the yield strength and tensile strength of a steel pipe vary depending on a tempering temperature.
Figure 3:
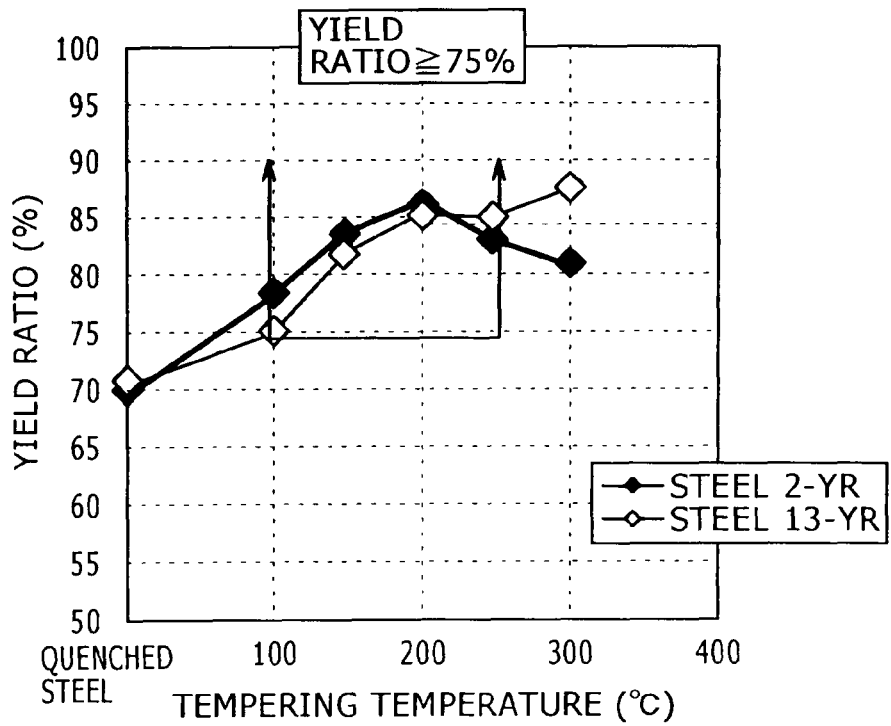
FIG. 3 is a graph showing how the yield ratio of a steel pipe varies depending on a tempering temperature.

FIGS. 2 and 3 show the properties of Steels No. 2 and No. 13 as representative examples of steels having chemical compositions within the above-specified ranges, in which the properties were determined at different tempering temperatures. FIG. 2 shows how the yield strength (0.1%-proof stress) and tensile strength vary depending on the tempering temperature, and FIG. 3 shows how the yield ratio varies depending on the tempering temperature.

FIG. 2 demonstrates that relatively high yield strengths (0.1%-proof stresses) are obtained at tempering temperatures of 100° C. or higher and 250° C. or lower, and that the tensile strength is lowered as a result of tempering but remains at a satisfactory level of 1750 N/mm² or more. FIG. 3 demonstrates that relatively high yield ratios are obtained at tempering temperatures of 100° C. or higher and 250° C. or lower.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A high-strength electric resistance welded steel pipe comprising:
   0.2 to 0.4 percent by mass carbon (C),
   0.05 to 0.5 percent by mass silicon (Si),
   0.5 to 2.5 percent by mass manganese (Mn),
   0.025 percent by mass of less phosphorus (P),
   0.01 percent by mass of less sulfur (S),
   0.01 to 0.15 percent by mass aluminum (Al),
   0.01 to 2 percent by mass copper (Cu),
   0.05 to 2 percent by mass chromium (Cr),
   0.005 to 0.2 percent by mass titanium (Ti), and
   0.0002 to 0.005 percent by mass boron (B),
   wherein the steel pipe has a tensile strength of 1750 N/mm² or more, a 0.1%-proof stress of 1350.8 N/mm² or more, a ratio of said 0.1%-proof stress to said tensile strength of 75.3% or more, and a Charpy impact value at a testing temperature of minus 40° C. of 50 J/cm² or more.

2. The electric resistance welded steel pipe according to claim 1, further comprising 0.002 to 0.2 percent by mass niobium (Nb).

3. The electric resistance welded steel pipe according to claim 1, further comprising 0.005 to 0.5 percent by mass vanadium (V).

4. The electric resistance welded steel pipe according to claim 1, further comprising 0.005 to 0.5 percent by mass zirconium (Zr).

5. The electric resistance welded steel pipe according to claim 1, further comprising 0.02 to 1 percent by mass molybdenum (Mo).

6. The electric resistance welded steel pipe according to claim 1, further comprising 0.05 to 3 percent by mass nickel (Ni).

7. The electric resistance welded steel pipe according to claim 1, further comprising 0.0005 to 0.005 percent by mass calcium (Ca).

8. A method of manufacturing the electric resistance welded steel pipe of claim 1, comprising:

carrying out electric resistance welding of a steel sheet to form a steel pipe;

heating the steel pipe to a temperature equal to or higher than an $Ac_3$ transformation temperature and equal to or lower than 950° C. and quenching the heated steel pipe at a rate of 100° C. per second or more in induction hardening; and heating the steel pipe after the induction hardening to a temperature ranging from 100° C. to 250° C., holding the steel pipe at this temperature for 1 minute to 60 minutes, and cooling the steel pipe in tempering, wherein the steel sheet comprises:

0.2 to 0.4 percent by mass carbon (C),
0.05 to 0.5 percent by mass silicon (Si),
0.5 to 2.5 percent by mass manganese (Mn),
0.025 percent by mass of less phosphorus (P),
0.01 percent by mass of less sulfur (S),
0.01 to 0.15 percent by mass aluminum (Al),
0.01 to 2 percent by mass copper (Cu),
0.05 to 2 percent by mass chromium (Cr),
0.005 to 0.2 percent by mass titanium (Ti), and
0.0002 to 0.005 percent by mass boron (B).

9. The high-strength electric resistance welded steel pipe according to claim 1 comprising:

0.2 to 0.4 percent by mass carbon (C),
0.05 to 0.5 percent by mass silicon (Si),
0.5 to 2.5 percent by mass manganese (Mn),
0.025 percent by mass of less phosphorus (P),
0.01 percent by mass of less sulfur (S),
0.01 to 0.15 percent by mass aluminum (Al),
0.01 to 2 percent by mass copper (Cu),
0.05 to 2 percent by mass chromium (Cr),
0.005 to 0.2 percent by mass titanium (Ti), and
0.0002 to 0.005 percent by mass boron (B), wherein the steel pipe has a tensile strength of 2057.2 $N/mm^2$ or more, a 0.1%-proof stress of 1572.3 $N/mm^2$ or more, 76.4% or higher of the ratio of said 0.1%-proof stress to said tensile strength, and a Charpy impact value at a testing temperature of minus 40° C. of 50 $J/cm^2$ or more.

* * * * *